(12) United States Patent
Katayama

(10) Patent No.: US 9,392,250 B2
(45) Date of Patent: Jul. 12, 2016

(54) IMAGING APPARATUS AND CONTROL METHOD THEREFOR

(75) Inventor: Tatsushi Katayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 13/544,633

(22) Filed: Jul. 9, 2012

(65) Prior Publication Data

US 2013/0016191 A1    Jan. 17, 2013

(30) Foreign Application Priority Data

Jul. 12, 2011  (JP) ................................ 2011-154031

(51) Int. Cl.
| H04N 13/02 | (2006.01) |
| H04N 13/00 | (2006.01) |
| H04N 13/04 | (2006.01) |

(52) U.S. Cl.
CPC ....... H04N 13/0022 (2013.01); H04N 13/0296 (2013.01); H04N 13/0452 (2013.01)

(58) Field of Classification Search
None
See application file for complete search history.

(56) References Cited

U.S. PATENT DOCUMENTS

| 2008/0084484 A1* | 4/2008 | Ochi et al. ................. 348/222.1 |
| 2011/0234881 A1* | 9/2011 | Wakabayashi et al. .. 348/333.05 |
| 2011/0292183 A1* | 12/2011 | Tajiri et al. ...................... 348/50 |
| 2012/0086782 A1* | 4/2012 | Wada ............................... 348/47 |

FOREIGN PATENT DOCUMENTS

| JP | H09-187040 A | 7/1997 |
| JP | 11-155155 A | 6/1999 |
| JP | 2005-49668 A | 2/2005 |
| JP | 2010-213084 A | 9/2010 |
| JP | 2011-29700 A | 2/2011 |

* cited by examiner

*Primary Examiner* — Sath V Perungavoor
*Assistant Examiner* — Janese Duley
(74) *Attorney, Agent, or Firm* — Canon USA Inc. IP Division

(57) ABSTRACT

The amount of parallax of a 3D image can be adjusted by intuitive operation. A zoom lever is thrown to telephoto side to cause the graphic processing unit to generate images for the left eye and the right eye adjusted such that a position where a component is drawn is far from a center line and the zoom lever is thrown to wide angle side to cause the graphic processing unit to generate images for the left eye and the right eye adjusted such that the position where the component is drawn is near the center line.

22 Claims, 16 Drawing Sheets

FIG.2
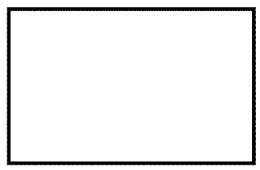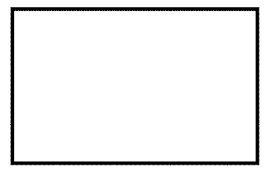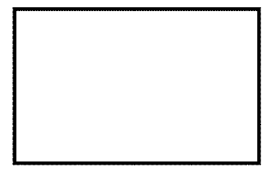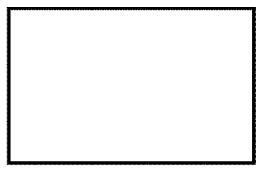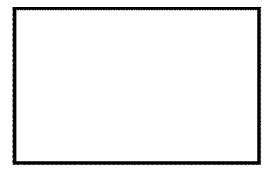
REPRODUCTION INDEX    DATE AND TIME: 2009/04/10

BACK FACE OF APPARATUS

FIG.4

| INFORMATION ABOUT APPARATUS | MANUFACTURER NAME<br>PRODUCT CODE<br>SERIAL NUMBER<br>⋮ |
|---|---|
| INFORMATION ABOUT DISPLAY CONDITION | CORRESPONDING RESOLUTION<br>ASPECT RATIO<br>DISPLAY FORMAT<br>FRAME RATE<br>⋮<br>CORRESPONDING TO 3D?<br>3D DISPLAY FORMAT |
| INFORMATION ABOUT SOUND CONDITION | CORRESPONDING TO DOLBY<br>CORRESPONDING TO DTS<br>⋮ |

IN CASE OF DIVIDING
PIXELS INTO TWO PARTS

IN CASE OF DIVIDING
PIXELS INTO FOUR PARTS

950

960

IMAGING APPARATUS AND CONTROL METHOD THEREFOR

BACKGROUND OF THE INVENTION

1. Field of the Invention

The present invention relates to an imaging apparatus, a control method for the imaging apparatus, a program, and a storage medium and, in particular, to a technique preferably used for displaying a three dimensional (3D) image.

2. Description of the Related Art

In recent years, a movie using a three dimensional (hereinafter referred to as 3D) image has increased. Along with that, a home-use television set corresponding to stereoscopic display of a 3D image similarly has been developed. When a recording and reproducing apparatus such as a camcorder is connected to the home-use television set corresponding to stereoscopic display, it is assumed that a graphic user interface (GUI) of the camcorder will be commonly displayed in 3D.

The 3D image is displayed using stereoscopic principle such that images for the left eye and the right eye are prepared and respective images are relatively shifted in the horizontal direction to display the left eye image and right eye image which are different in relative position. An amount of protrusion from a screen (a stereoscopic effect) is controlled by difference in the relative position. The difference in the relative position is taken as binocular parallax. Thus, a user perceives parallax between the left eye image and right eye image to view a stereoscopic image according to the amount of parallax.

Until now, Japanese Patent Application Laid-Open No. 2005-49668 discusses an apparatus, serving as the GUI using a stereoscopic display, in which attributes of an object (such as use frequency, importance, taste of a user, and others) are extracted and an amount of protrusion of stereoscopic display (a stereoscopic effect) and a stereoscopic display period are determined according to the extracted attributes to convert data. Japanese Patent Application Laid-Open No. 11-155155 discusses another apparatus in which the user can optionally adjust parallax based on the control signal from a remote-control interface to adapt a stereoscopic effect to an individual observer.

In the apparatus discussed in Japanese Patent Application Laid-Open No. 2005-49668, a stereoscopic display form of an object is determined based on information about its attribute, so that the user cannot optionally change the stereoscopic effect. In the 3D display, the stereoscopic effect varies according to the user, so that due to a predetermined amount of parallax, a desired stereoscopic effect is not acquired depending on the user. In the apparatus discussed in Japanese Patent Application Laid-Open No. 11-155155, although the user can optionally change the stereoscopic effect, consideration is not made as to what operation should be made to intuitively adjust parallax.

SUMMARY OF THE INVENTION

The present invention is directed to being capable of adjusting the amount of parallax of a 3D image by intuitive operational feeling.

According to an aspect of the present invention, an imaging apparatus includes an imaging unit, a reception unit configured to receive operation from a user, an optical zoom unit configured, at a time of imaging by the imaging unit, to perform control such that in response to receiving a first operation by the reception unit, the optical zoom unit drives a zoom lens used for imaging in the imaging unit to a telephoto side to perform optical zoom, and in response to receiving a second operation by the reception unit, the optical zoom unit drives the zoom lens to a wide angle side, an output unit capable of outputting an image for 3D display to a display unit, and a parallax-amount adjustment unit configured, in response to receiving the first operation or the second operation by the reception unit while the output unit is outputting the image for the 3D display, to adjust an amount of parallax of the image for the 3D display to be output from the output unit.

According to another aspect of the present invention, the stereoscopic effect of the GUI can be intuitively and simply adjusted by the zoom operation member of the imaging apparatus.

This summary of the invention does not necessarily describe all necessary features so that the invention may also be a sub-combination of these described features. Further features of the present invention will become apparent from the following description of exemplary embodiments with reference to the attached drawings, in which like reference characters designate the same or similar parts throughout the figures thereof.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating an example of an index screen.

FIG. 4 is a diagram illustrating an example of conditional information according to the present exemplary embodiment.

DESCRIPTION OF THE EMBODIMENTS

Various exemplary embodiments, features, and aspects of the invention will be described in detail below with reference to the drawings.

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1:
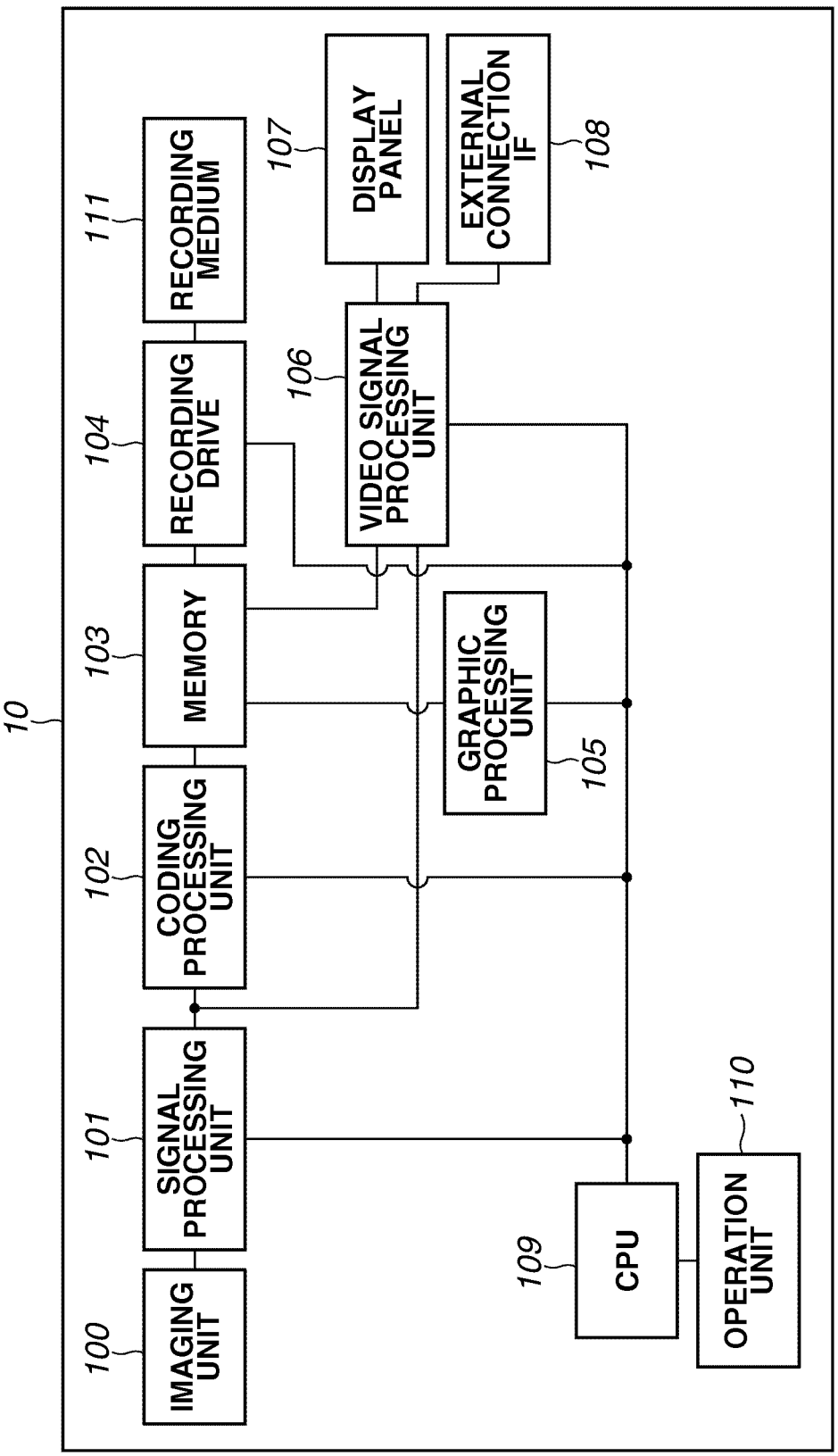
FIG. 1 is a block diagram illustrating an example of configuration of an imaging apparatus according to an exemplary embodiment of the present invention.

A first exemplary embodiment of the present invention will be described below with reference to the drawings. FIG. 1 is a block diagram illustrating an example of configuration of an imaging apparatus 10 according to the present exemplary embodiment. In FIG. 1, an imaging unit 100 includes an optical system such as a lens and others, an image sensor, and an analog-to-digital (AD) converter. A signal processing unit 101 subjects an imaged and generated signal to predetermined processing. A coding processing unit 102 subjects an video signal to compression and decoding. A memory 103 temporarily stores a coded video signal. A recording drive 104 records the video signal on a recording medium 111 such as a secure digital (SD) card, a hard disk, a digital versatile disc (DVD), and the like.

A graphic processing unit 105 generates on-screen-display (OSD) information such as a character and an icon, and also generates a display screen. A video signal processing unit 106 converts image data into various types of video signals. When the video signal processing unit 106 functions as a display control unit, the video signal processing unit 106 superimposes the OSD information on a video signal to be captured and outputs the OSD information thereon to the display panel 107. The display panel 107 is a display unit such as a liquid crystal display (LCD). An external connection interface (IF) 108 is connected to an external device and subjects the signal output from the video signal processing unit 106 to a predetermined processing and transmits the signal subjected thereto to the external device. A central processing unit (CPU) 109 controls the entire imaging apparatus 10. An operation unit 110 is an operation member such as a button, a zoom lever, and a touch panel and detects depression of the button, position of the zoom lever, and position of a cross key.

Operation in the recording mode of the imaging apparatus 10 according to the present exemplary embodiment will be described below. The imaging unit 100 photoelectrically converts an input object image and transmits the converted signal to the signal processing unit 101. The signal processing unit 101 converts the photoelectrically converted video signal into a luminance signal and a color-difference signal and subjects the photoelectrically converted video signal to various types of signal processing such as automatic gain control (AGC), gamma correction, and the like. The coding processing unit 102 compresses the video signal transmitted from the signal processing unit 101 and stores the compressed video signal in the memory 103. The recording drive 104 records the compressed video signal stored in the memory 103 in the recording medium 111 at a predetermined timing.

Operation in the reproduction mode thereof is described below. When the mode of the imaging apparatus is changed into the reproduction mode by the user operating the operation unit 110, as illustrated in FIG. 2, an index screen 200 for displaying a representative image of captured video is displayed on the display panel 107 as the GUI. The following describes operations until the index screen 200 will be displayed.

When the CPU 109 detects the operation state of the operation unit 110 to determine that the operation state transitions to a reproduction mode, the CPU 109 controls the recording drive 104 to read the video data recorded in the recording medium 111. The coding process unit 102 decodes the leading frame of the read video data as a representative image data and stores the decoded frame in the memory 103. Thus, video data corresponding to the representative image displayed on the index screen 200 illustrated in FIG. 2 are sequentially read from the recording medium 111 and the above processing is repeated.

The graphic processing unit 105 generates an index screen for arranging representative images with each representative image enlarged or reduced as needed using the representative image data stored in the memory 103. The graphic processing unit 105 also generates an OSD image such as characters indicating capture date and time and an icon. The video signal processing unit 106 receives the representative image data stored in the memory 103, the index screen and the OSD image data, converts them into a predetermined signal, and converts thereof to the predetermined signal to output the signal to the display panel 107. According to above series of operations, the index screen 200 in FIG. 2 is displayed. In the index screen 200, a selection frame 201 of the representative image can be moved according to the operation of the cross key of the operation unit 110.

Figure 3A:
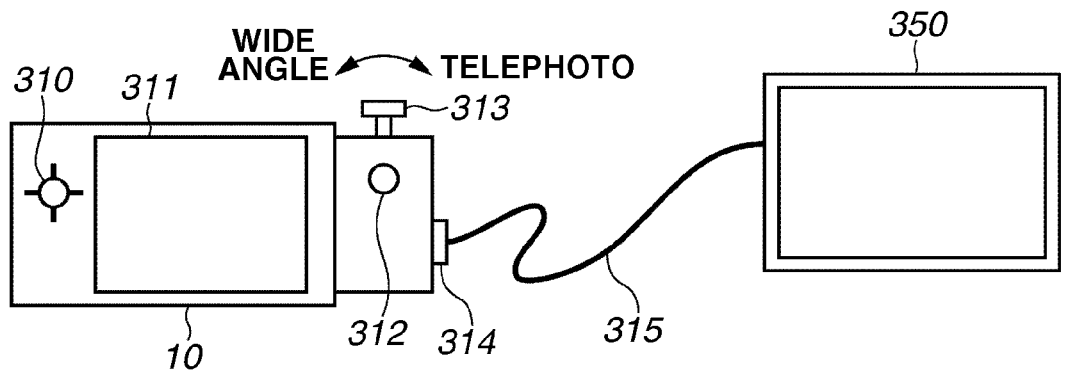
FIG. 3A illustrates an example of connection with a stereoscopic display device according to the present exemplary embodiment.

The following describes the external appearance of the imaging apparatus 10 and its connection with a stereoscopic display device being an external device. FIG. 3A illustrates the connection of the imaging apparatus 10 with the stereoscopic display device 350 having a stereoscopic display function according to the present exemplary embodiment.

In FIG. 3A, a cross key 310 is the one that is used for selecting menus or representative images displayed on a liquid crystal panel 311. A recording start button 312 is the one that is operated to instruct to start and stop recording. A zoom lever 313 can move a zoom lens to wide angle side by throwing the zoom lever 313 to the left and can move the zoom lens to telephoto side by throwing the zoom lever 313 to the right. The zoom lever 313 can also be used for scaling (electronic zoom) in reproduction, i.e., an image can be reduced by throwing the zoom lever 313 to the left and an image can be enlarged by throwing the zoom lever 313 to the right. The imaging apparatus 10 according to the present exemplary embodiment uses the zoom lever 313 as a means of moving in the depth direction of the stereoscopic display device 350 in stereoscopically displaying the GUI on the stereoscopic display device 350. A connection terminal 314 connects the stereoscopic display device 350 to the imaging apparatus 10 via a connection cable 315 to transfer video information and control information therebetween.

Figure 3B:
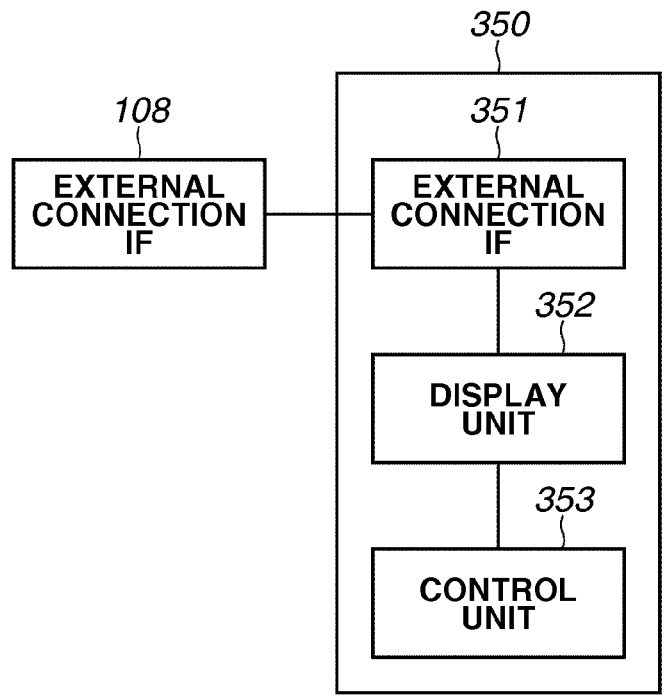
FIG. 3B is an example of internal configuration of the stereoscopic display device.

FIG. 3B is a block diagram illustrating an example of an internal configuration of the stereoscopic display device 350 according to the present exemplary embodiment. The imaging apparatus 10 according to the present exemplary embodiment can transmit and receive video data by connecting with an external device such as a monitor via the external connection IF 108. A high definition multimedia interface (HDMI) standard, for example, may be used as the external connection IF 108.

As illustrated in FIG. 3B, the stereoscopic display device 350 includes an external connection IF 351 connected with the imaging apparatus 10 according to the present exemplary embodiment to communicate therewith, a display unit 352 such as a liquid crystal display for stereoscopic display, and a control unit 353 for controlling the entire 3D display device 350.

FIG. 4 is a diagram illustrating an example of conditional information acquired from the stereoscopic display device 350 to detect the display capability of the stereoscopic display device 350. Information acquired from the stereoscopic display device 350 includes a manufacturer of the monitor, a product code, and a serial number which are information about the device for identifying the monitor. Information about display condition includes corresponding resolution, an aspect ratio which can correspond, an image display format, and a frame rate. Information about sound condition includes information about correspondence to Dolby and correspondence to digital theater system (DTS). In the present exemplary embodiment, information about presence or absence of correspondence to 3D and 3D display format are added as information about display condition.

The imaging apparatus 10 and the stereoscopic display device 350 connect and communicate with each other using a predetermined protocol via their respective external connection IFs. The imaging apparatus 10 acquires information illustrated in FIG. 4 from the stereoscopic display device 350 and changes over the display process of the GUI in accordance with the acquired conditions. A 3D display system will be described below with reference to FIG. 7. The 3D display system uses a known technique. Three systems will be described below.

Figure 5:
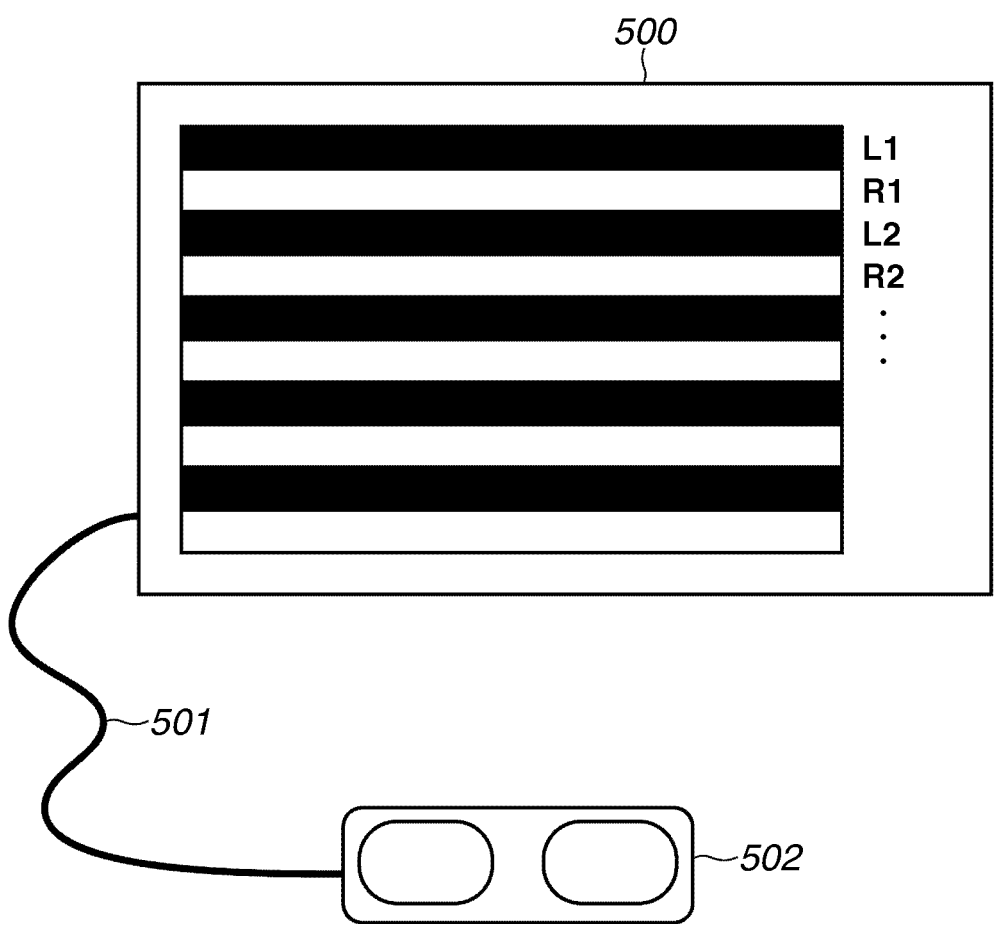
FIG. 5 illustrates an outline of stereoscopic display based on a line-by-line system.

FIG. 5 illustrates an outline of 3D display based on a line-by-line system. In the line-by-line system, images for the left eye and the right eye are alternately displayed on the scanning lines of the monitor 500. At the time of a stereoscopic view, a pair of liquid crystal shutter glasses 502 is connected to a monitor 500 via cable 501. The pair of liquid crystal shutter glasses 502 is controlled in synchronization with the monitor 500 displaying the left-eye lines L1, L2, . . . and the right-eye lines R1, R2, . . . in a unit of a field in an interlace scanning. Thereby, displaying different images on the left eye and the right eye for each field according to a parallax to enable the stereoscopic vision.

Figure 6:
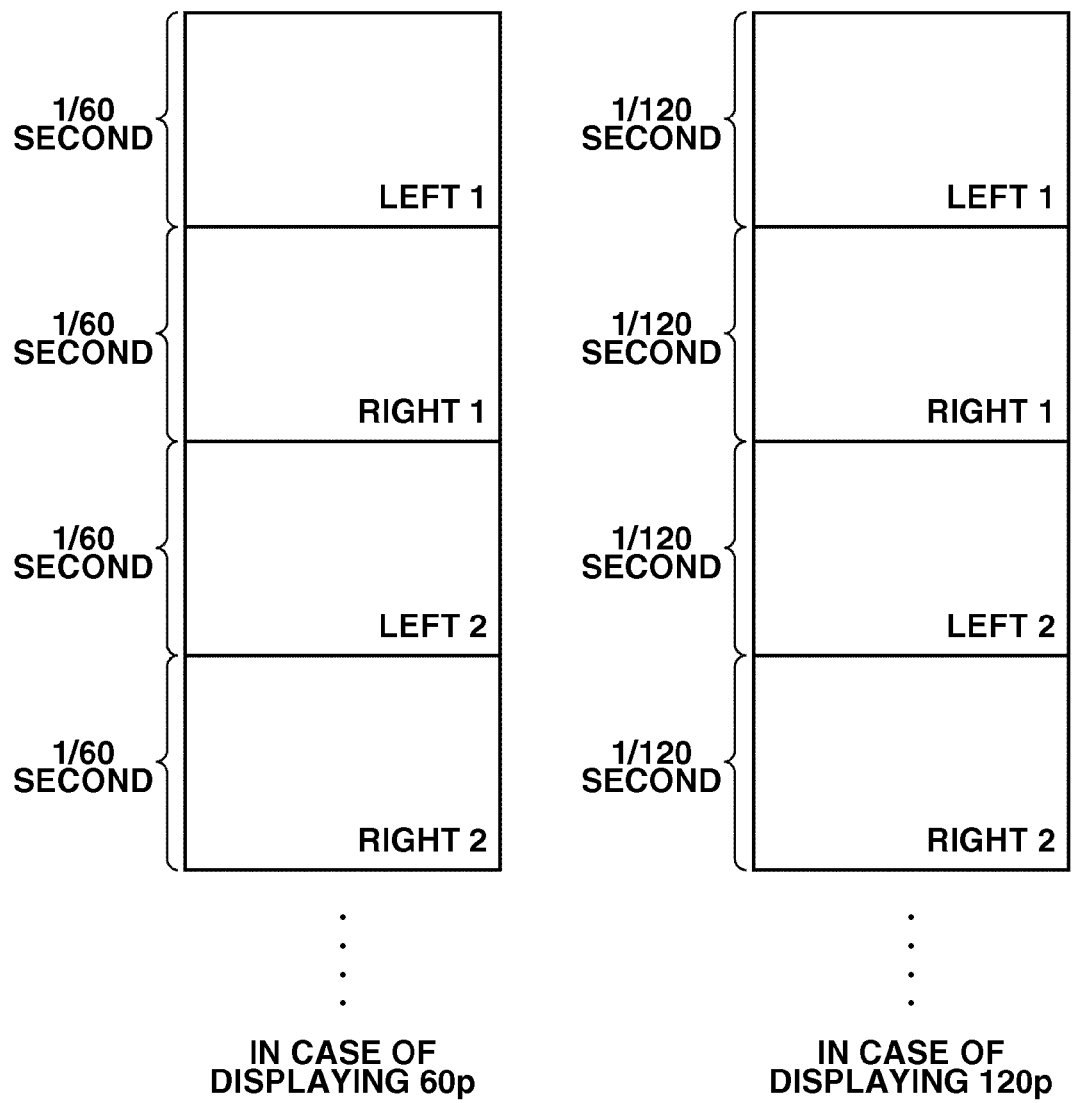
FIG. 6 illustrates an outline of stereoscopic display based on a frame sequential system.

FIG. 6 illustrates an outline of stereoscopic display based on a frame sequential system. The system performs display based on a progressive scanning method. The following describes 60p display in which a frame is switched in a unit of ⅙₀ sec and 120p display in which the frame is switched in a unit of ¹⁄₁₂₀ sec.

The 60p display performs display while alternately switching images for the left eye and the right eye in a unit of ⅙₀ sec. Images left 1, right 1, left 2, and right 2 illustrated in FIG. 6 are images for the left eye and the right eye for each frame. The 120p display performs display while alternately switching images for the left eye and the right eye in a unit of ¹⁄₁₂₀ sec. At the time of a stereoscopic vision, the pair of liquid crystal shutter glasses 502 illustrated in FIG. 5 is controlled in synchronization with a frame switching signal.

Figure 7A:
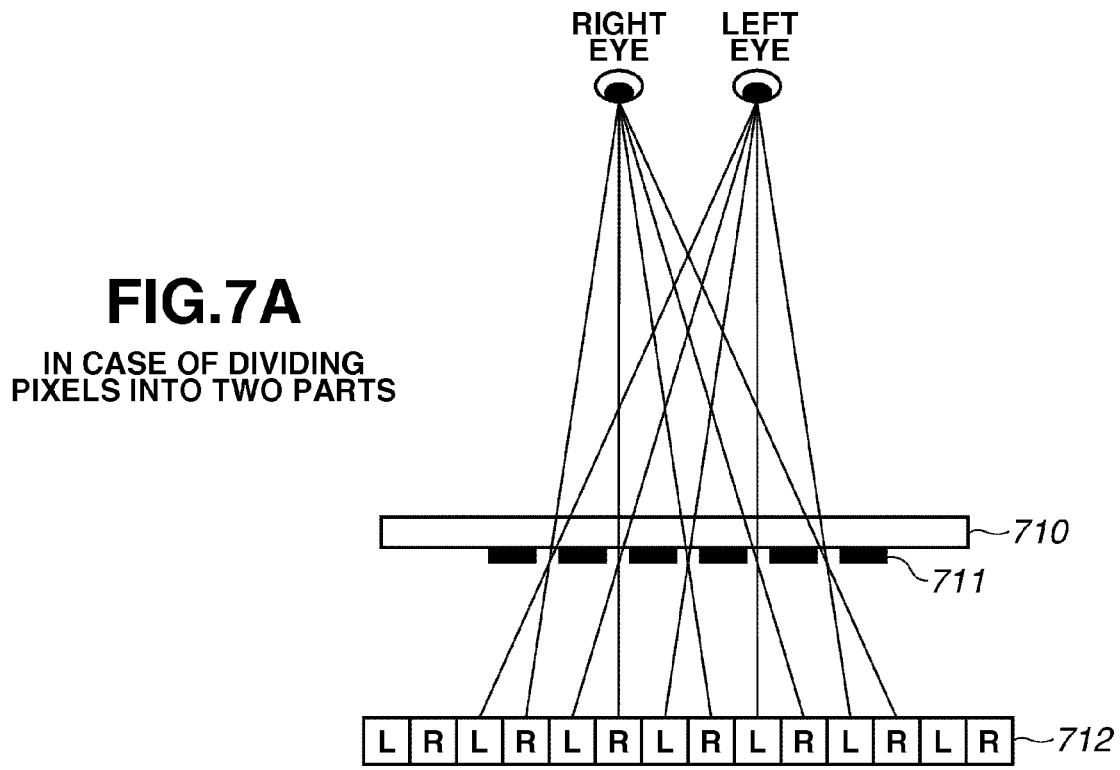
FIGS. 7A and 7B are schematic diagrams illustrating a multi-ocular stereoscopic display system.
Figure 7B:
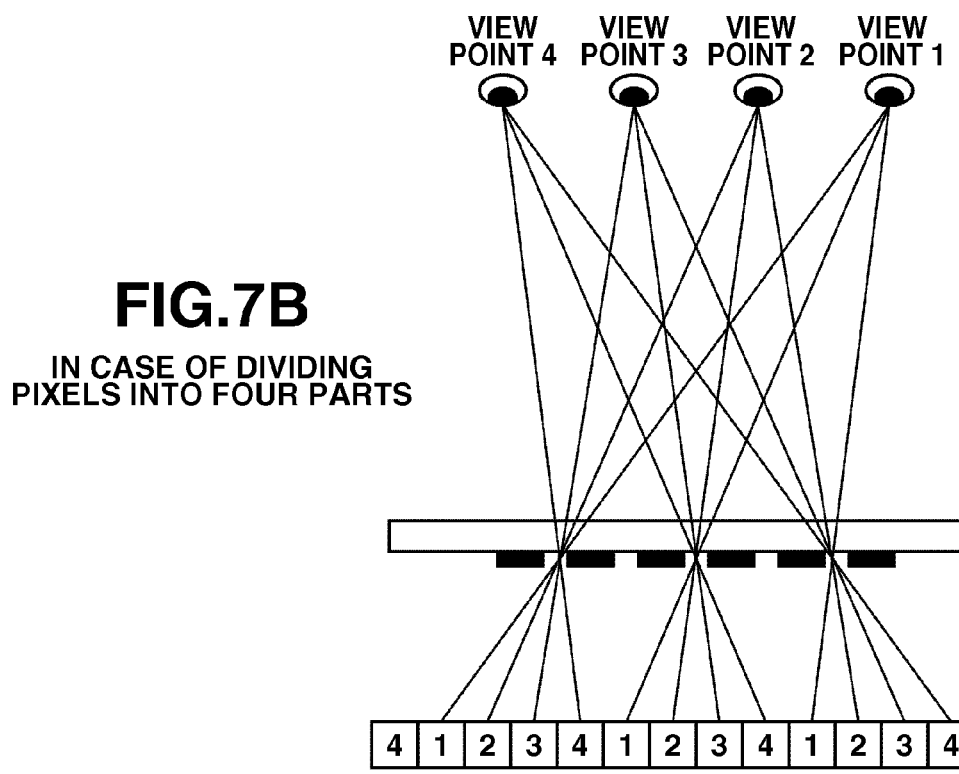

FIGS. 7A and 7B are schematic diagrams illustrating a multi-ocular stereoscopic display system and illustrate examples of a two-division multi-ocular display and a four-division multi-ocular display. In FIG. 7A, the two-division multi-ocular stereoscopic display allocates a liquid crystal display (LCD) 712 to the left-eye pixel L and the right-eye pixel R. A parallax barrier 711 attached to a filter 710 at the front surface of the panel cuts off an optical path so that the pixels L and R are projected only to the left eye and the right eye respectively. This projects images different from each other onto the left eye and the right eye to realize a stereoscopic vision. As illustrated in FIG. 7B, if the number of divisions of a pixel is four, the number of viewpoints in which the stereoscopic vision is enabled can be increased.

Figure 8:
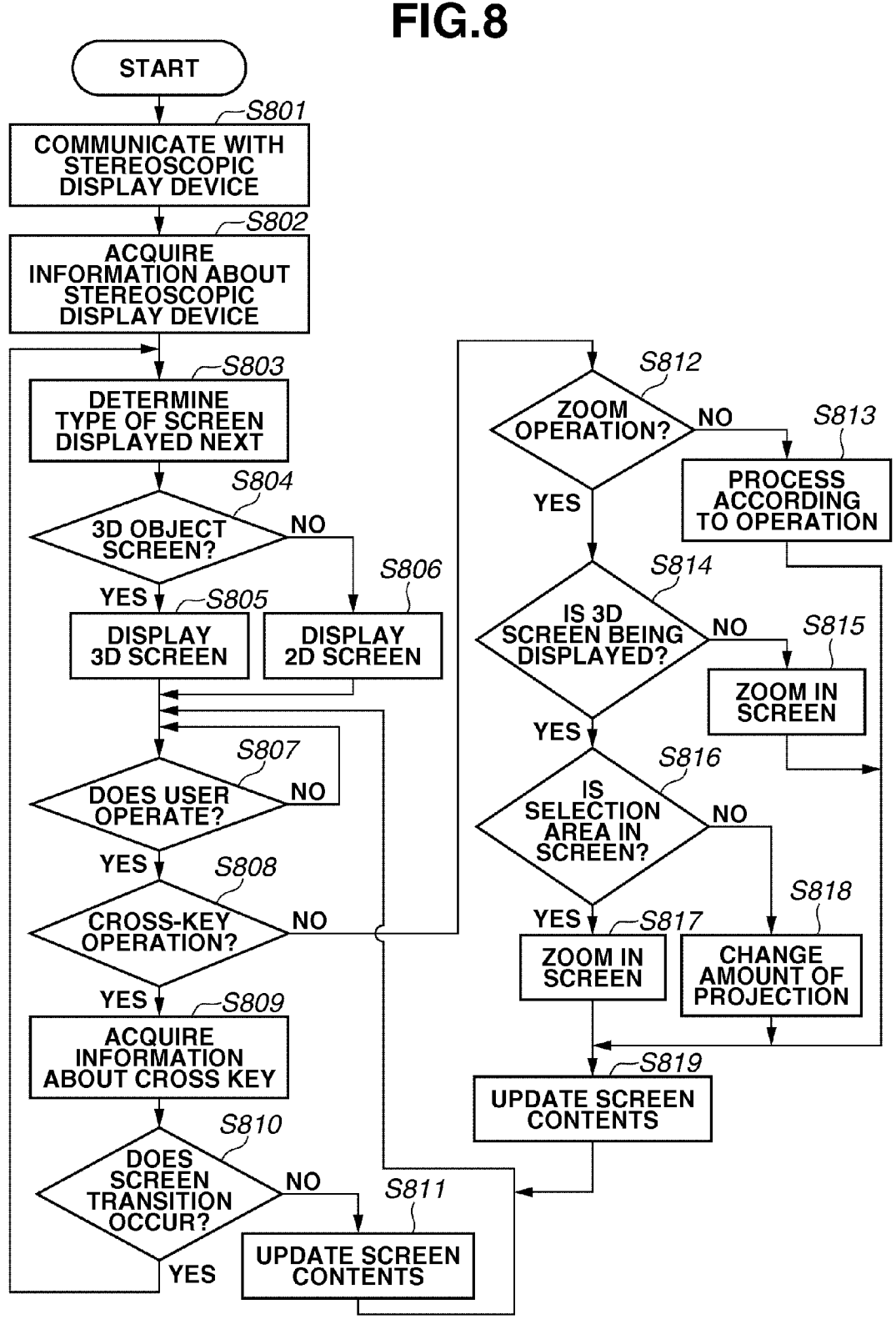
FIG. 8 is a flow chart illustrating an example of a processing procedure for displaying a GUI on the stereoscopic display device from the imaging apparatus according to a first exemplary embodiment.

FIG. 8 is a flow chart illustrating an example of a processing procedure for displaying the GUI on the stereoscopic display device 350 by the imaging apparatus 10 according to the present exemplary embodiment. The following describes operation for displaying a 3D GUI with reference to FIG. 8. Each process illustrated in FIG. 8 is controlled by the CPU 109. In the description in FIG. 8, it is premised that the imaging apparatus 10 is connected to the stereoscopic display device 350 via the connection cable 315 as illustrated in FIG. 3A. When the stereoscopic display device 350 receives a video signal, the control unit 353 performs control whereby the video signal is directly displayed on the display unit 352.

In step S801, the imaging apparatus 10 starts communication with the stereoscopic display device 350 via the external connection IF 108. In step S802, the imaging apparatus 10 acquires the conditional information illustrated in FIG. 4 from the stereoscopic display device 350 via the external connection IF 108 to detect whether the stereoscopic display device 350 has a 3D display capability. In the present exemplary embodiment, the stereoscopic display device 350 is regarded as having the 3D display capability. If the stereoscopic display device 350 does not have the 3D display capability, the graphic processing unit 105 generates the GUI informing to that effect. The video signal processing unit 106 transmits the data to the stereoscopic display device 350 via the external connection IF 108 and causes the screen thereof to display the data.

If the imaging apparatus 10 detects that the stereoscopic display device 350 has the 3D display capability, the imaging apparatus 10 acquires information about the 3D display format from the conditional information. The graphic processing unit 105 sets a conversion processing system for a spectroscopic image according to the acquired 3D display format. As illustrated in FIGS. 5, 6, 7A, and 7B, the 3D display format corresponds to the line-by-line system, the frame sequential system, and the multi-ocular stereoscopic display system. The data is converted into the spectroscopic image according to each system. A system except the 3D display systems illustrated in FIGS. 5, 6, 7A, and 7B may be used. The video signal processing unit 106 transmits an initial screen data of the GUI to the stereoscopic display device 350 via the external connection IF 108 to cause the stereoscopic display device 350 to display the initial screen data of the GUI.

In the present exemplary embodiment, the imaging apparatus 10 converts data into the stereoscopic image according to the 3D display system, however, alternatively, the imaging apparatus 10 may output images for the left eye and the right eye to the stereoscopic display apparatus 350 at a predetermined frame rate. In this case, the stereoscopic display apparatus 350 converts the received images for the left eye and the right eye into the 3D image according to the predetermined 3D display format to perform the 3D display.

In step S803, the CPU 109 determines the type of a screen to be displayed next. Specifically, the CPU 109 determines whether the type of a screen is of a 2D or a 3D object screen. The 2D object screen is used for displaying an image-capturing screen or a menu screen. The 3D object screen is used for displaying an index screen for displaying a reduced representative image of a recorded image. If a captured moving image or still image is displayed in a full-screen display, the 2D and the 3D display can be switched by the operation unit 110. At this point, it may be optionally selected which screen is taken as a 3D display. The type of a screen is determined by the CPU 109. The type of a screen can be determined by assigning information representing a type for each transit screen.

Figure 9A:
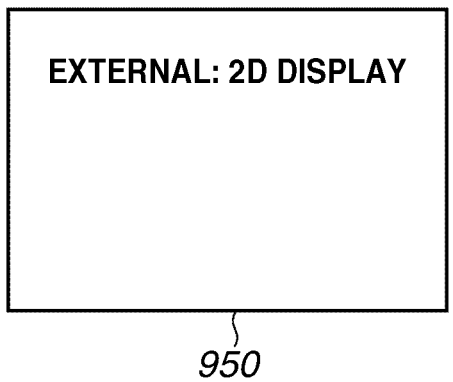
FIGS. 9A and 9B are diagrams illustrating examples of screens displayed on the display panel of the imaging apparatus when the 2D or 3D screen is displayed on the stereoscopic display device.

In step S804, the CPU 109 determines whether the type of a next screen is of a 3D object screen. As a result of the determination, if the type of the next screen is of a 2D object screen (NO in step S804), the processing proceeds to step S806, the graphic processing unit 105 generates 2D screen data and the video signal processing unit 106 transmits the 2D screen data to the stereoscopic display apparatus 350 via the external connection IF 108 and causes the stereoscopic display apparatus 350 to display the 2D screen. At this point, the display panel 107 of the imaging apparatus 10 displays, on a screen 950, to the effect that the 2D display is performed in the external device, as illustrated in FIG. 9A.

Figure 9B:
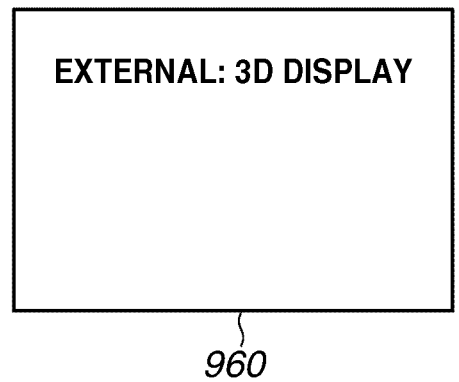

As a result of the determination, if the type of the next screen is of a 3D object screen (YES in step S804), the processing proceeds to step S805, the graphic processing unit 105 generates a 3D screen data according to the conversion processing system of the stereoscopic image. The video signal processing unit 106 transmits the 3D screen data to the stereoscopic display apparatus 350 via the external connection IF 108 and causes the stereoscopic display apparatus 350 to display the 3D screen. At this point, the display panel 107 of the imaging apparatus 10 displays, on the screen 960, to the effect that the 3D display is performed in the external device, as illustrated in FIG. 9B.

Figure 10A:
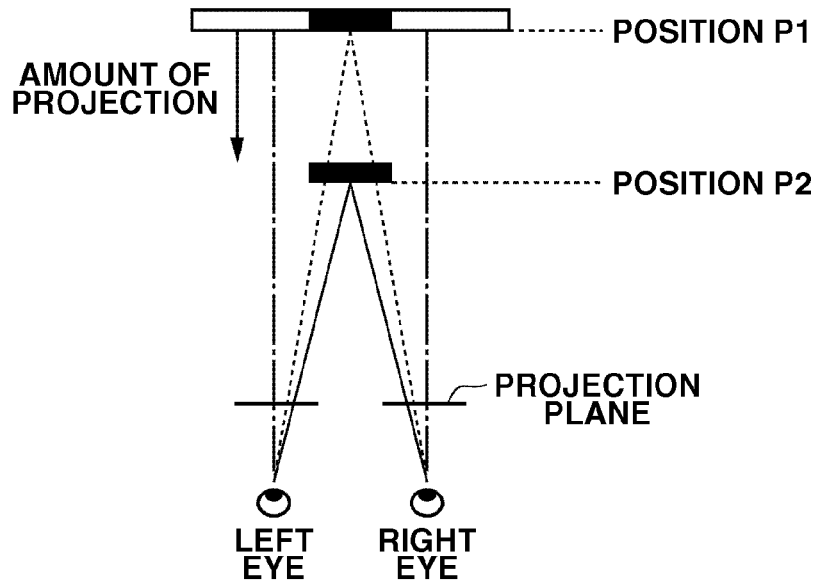
FIGS. 10A, 10B, and 10C are schematic diagrams illustrating the outline of the 3D display.
Figure 10B:
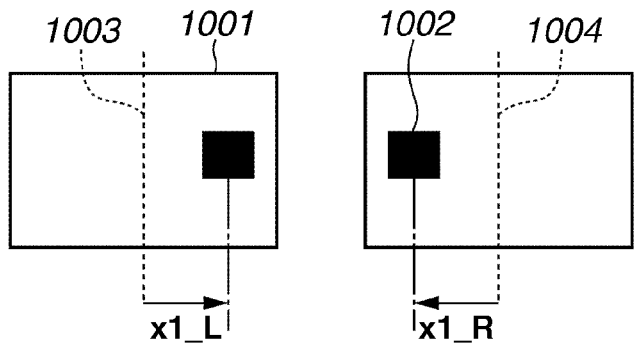
Figure 10C:
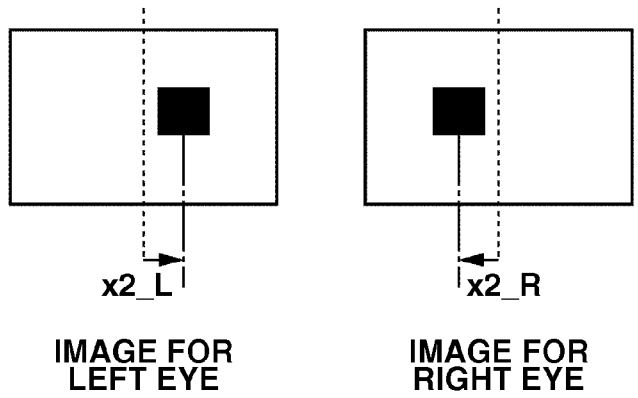

A 3D display operation in step S805 will be described below. FIGS. 10A, 10B, and 10C are schematic diagrams illustrating the 3D conversion of the GUI. Processing for the 3D conversion of the GUI is performed by the graphic processing unit 105. FIG. 10A is a schematic diagram illustrating the relationship between an amount of protrusion and positions on a projection surface in stereoscopic vision. FIG. 10B illustrates an example of screens for the left eye and the right eye when a stereoscopic image is generated in a position P2 illustrated in FIG. 10A. FIG. 10C illustrates an example of screens when a stereoscopic image is generated in a position P1 illustrated in FIG. 10A.

As illustrated in FIGS. 10A, 10B, and 10C, a stereoscopic vision is realized by projecting an image providing the left eye and the right eye with parallax. An amount of protrusion is adjusted by shifting a position where a component 1002 is drawn on a screen 1001 from center lines 1003 and 1004 of the respective screens by a predetermined amount.

If a stereoscopic vision is generated in the position P2, as illustrated in FIG. 10B, the component 1002 is drawn on the image for the left side in a position shifted by x1_L to the right from the center line 1003 and the component 1002 is drawn on the image for the right side in a position shifted by x1_R to the left from the center line 1004. If a stereoscopic vision is generated in the position P1, as illustrated in FIG. 10C, the component 1002 is drawn on the image for the left side in a position shifted by x2_L to the right from the center line 1003 and the component 1002 is drawn on the image for the right side in a position shifted by x2_R to the left from the center line 1004. Thus, the graphic processing unit 105 generates the GUI for the left eye and the right eye in which positions where components are displayed are shifted in accordance with parallax and stores the data in the memory 103.

The video signal processing unit 106 converts data of the GUI for the left eye and the right eye stored in the memory 103 to predetermined video signals according to the 3D display system. For the stereoscopic display based on the frame sequential system illustrated in FIG. 6, for example, the video signal processing unit 106 alternately reads images for the left eye and the right eye in a specified frame driving cycle, converts the images to predetermined video signals and outputs the video signals to the stereoscopic display device 350 via the external connection IF 108. This enables the stereoscopic display device 350 to display a GUI in 3D. Even in other 3D display systems, images are converted to video signals according to the display system to enable the stereoscopic display device 350 to perform stereoscopic display.

For the 3D display system to which the imaging apparatus 10 is unadaptable, the graphic processing unit 105 generates only one screen of the normal 2D display screen. The video signal processing unit 106 subjects the display screen data to conversion processing and outputs the same video signal for the left eye and the right eye. In this case, the same image without parallax between the left eye and the right eye is projected, so that a 2D GUI screen is displayed.

When the imaging apparatus 10 communicates with the stereoscopic display device 350, the imaging apparatus 10 may acquire information as to whether 3D is displayed from the stereoscopic display device 350. Thereby, an adaptable operation is allowed such that, at the time of connecting the imaging apparatus 10 to the stereoscopic display device 350, only if the screen is displayed in 3D, the GUI is converted to the 3D, or otherwise, if the screen is displayed in 2D, the GUI is displayed in 2D.

Returning to the description of FIG. 8, the 2D or 3D screen is displayed on the stereoscopic display device 350. In step S807, the CPU 109 waits until the CPU detects the user's operation from the operation unit 110. If the CPU 109 detects the user operation (YES in step S807), the processing proceeds to step S808. In step S808, the CPU determines whether the user's operation corresponds to the cross key 310 illustrated in FIG. 3A. As a result of the determination, if the operation corresponds to the cross key 310 (YES in step S808), the processing proceeds to step S809. The CPU 109 acquires key information from the operation unit 110.

In step S810, the CPU analyzes the acquired key information to determine whether a screen transition occurs. The screen transition occurs when a screen display mode is changed. For example, the transition occurs when display is changed from the full screen of a 2D image to a menu screen or when display is changed from a menu screen to an index screen. As a result of the determination in step S810, if the screen transition occurs (YES in step S810), the processing proceeds to step S803 to determine the type of the next screen after the transition. Operations in step S803 and the subsequent steps are similar to the above ones. On the other hand, as a result of the determination, if the screen transition does not occur (NO in step S810), in step S811, contents of a screen are updated according to key operation. The processing proceeds to step S807 and the CPU 109 is in a standby state for user operation.

As a result of the determination, if the user's operation is not an operation to the cross key 310 (NO in step S808), the processing proceeds to step S812. In step S812, the CPU 109 determines whether the user's operation is an operation to the zoom lever 313 illustrated in FIG. 3A. As a result of the determination, if the user's operation is not an operation to the zoom lever 313 (NO in step S812), in step S813, processing is performed according to the operation. On the other hand, the user's operation is the operation to the zoom lever 313 (YES in step S812), in step S814, the CPU 109 determines whether the stereoscopic display device 350 is displaying the 3D screen. The determination is performed by the CPU 109 acquiring information from the stereoscopic display device 350 as to whether the 3D screen is displayed. As a result of the determination, if 3D images are not displayed (NO in step S814), the processing proceeds to step S815 to perform zooming in a screen (enlargement and reduction by an electronic zoom according to an operational direction).

Figure 11:
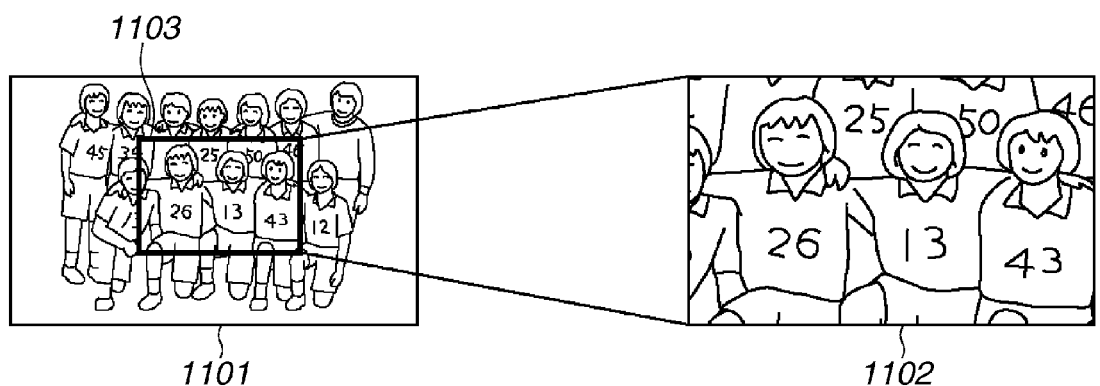
FIG. 11 is a diagram illustrating an example of a display screen in which a selection area is enlarged.

FIG. 11 is a drawing illustrating the outline of zooming in a screen. When a display screen 1101 before zooming is displayed on the stereoscopic display device 350 and the zoom lever 313 is thrown to telephoto side, a part of the screen is enlarged and displayed. A display screen 1102 illustrates a screen in which a zoom area 1103 is enlarged after the zoom lever 313 is operated. When the zoom area 1103 of the display screen 1101 is selected as a part of the screen, in step S815, zooming process is provided in the screen by operating the zoom lever 313. In other words, the graphic processing unit 105 generates the screen which is provided with the zooming process and different in an enlargement rate. The video signal processing unit 106 transmits the data to the stereoscopic display device 350 via the external connection IF 108 and causes the stereoscopic display device 350 to display the screen provided with the zooming process. A selection area can be set by instructions from the operation unit 110.

As a result of the determination, if the 3D screen is displayed (YES in step S814), in step S816, the CPU 109 determines whether the selection area is set in the screen. As a result of the determination, if the selection area is set (YES in step S816), the processing proceeds to step S817. The selection area is enlarged or reduced according to the operation of the zoom lever 313 as is the case with the above procedure. On the other hand, as a result of the determination, if the selection area is not set (NO in step S816), the processing proceeds to step S818. In step S818, the amount of protrusion is changed in conjunction with the operation of the zoom lever 313 and the graphic processing unit 105 performs the conversion process of the stereoscopic image. In step S819, the contents of the screen are updated.

Figure 12A:
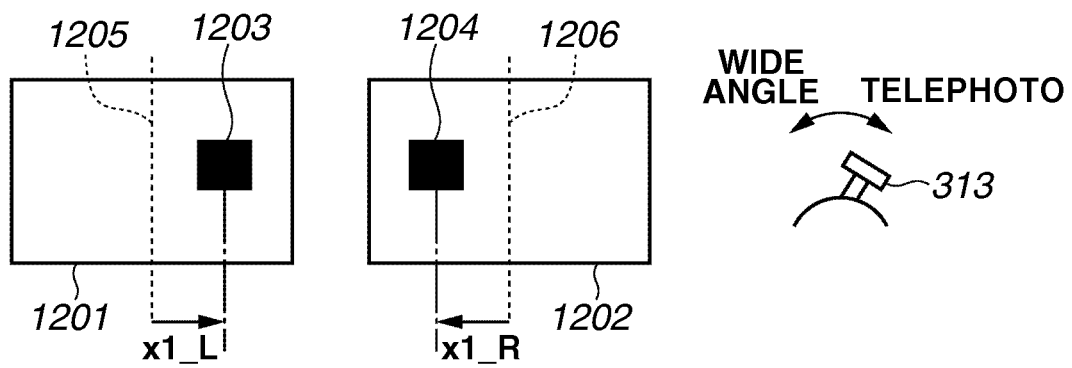
FIGS. 12A and 12B are schematic diagrams illustrated examples of images for the left eye and right eye at the time of operating a zoom lever.
Figure 12B:
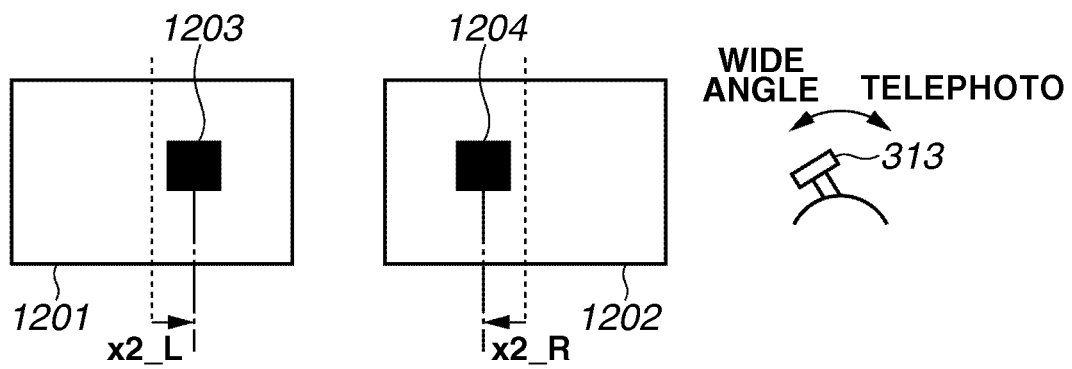

The change of the amount of protrusion by the operation of the zoom lever 313 will be described with reference to FIGS. 12A and 12B. FIGS. 12A and 12B are schematic diagrams illustrating the image for left eye 1201 and the image for right eye 1202 generated by the graphic processing unit 105. FIGS. 12A and 12B illustrate the relationship between the position of the zoom lever 313 and positions where the components 1203 and 1204 of the GUI are drawn. The component 1203 of the image for the left eye 1201 and the component 1204 of the image for the right eye 1202 indicate one of representative captured images.

As described in FIGS. 10A, 10B, and 10C, the stereoscopic display is realized by arranging the same display component with the amount of parallax set according to the amount of protrusion. FIG. 12A illustrates an image in which the position of the component 1203 is changed to a position shifted by x1_L to the right from the center line 1205 of the image for the left eye 1201 and an image in which the position of the component 1204 is changed to a position shifted by x1_R to the left from the center line 1206 of the image for the left eye 1202. In this case, the amount of protrusion corresponds to the position P2 illustrated in FIG. 10A. In FIG. 12B, parallax is changed to x2_L and x2_R in the image for the left eye 1201 and the image for the right eye 1202 respectively to perform adjustment so that the amount of protrusion corresponds to the position P1 illustrated in FIG. 10A.

In the present exemplary embodiment, the above adjustment of the parallax is realized by operating the zoom lever 313. Specifically, as illustrated in FIG. 12A, the zoom lever 313 is thrown in either direction to cause the graphic processing unit 105 to generate the image for the left eye and the image for the right eye image in which positions where the components 1203 and 1204 are drawn are adjusted. Thus, at the time of the stereoscopic display, throwing the zoom lever 313 to the telephoto direction causes the user to perceive the component of the GUI as if it popped up more toward the user. Throwing the zoom lever 313 to the wide angle direction causes the user to perceive the component of the GUI as if it backed away.

According to the present exemplary embodiment, a GUI screen is converted to the 3D image based on information acquired by communicating with the stereoscopic display device and the 3D image is output. At this point, the amount of protrusion of the stereoscopic display is adjusted by zoom lever. Performing enlargement (zoom-up) by an optical zoom or an electronic zoom by operating zoom to the telephoto side provides the user with the impression that an object approaches the user. Performing reduction (zoom-down) by the optical zoom or the electronic zoom by operating zoom to the wide angle side provides the user with the impression that an object goes off into the distance. This is close to sense of the adjustment of a stereoscopic effect in the 3D display, i.e., the amount of protrusion and the amount of depth are changed. Therefore, according to the present exemplary embodiment, the adjustment of a stereoscopic effect in the 3D display (parallax adjustment) is performed by operation similar to operation whereby to perform the optical zoom or the electronic zoom to allow changing the stereoscopic effect of the GUI by intuitive operation for the user. More specifically, in order that the sense that an object approaches the user corresponds to the operation, parallax is adjusted so that a stereoscopically displayed item (GUI component) pops up toward the user by operating a zoom operation member which is an operation method for enlarging by the optical zoom or the electronic zoom. To the contrary, in order that the sense that an object goes off into the distance corresponds to the operation, parallax is adjusted so that a stereoscopically displayed item (GUI component) goes off into the distance by operating the zoom operation member which is an operation method for reducing by the optical zoom or the electronic zoom. Thereby, the stereoscopic effect of the GUI can be changed by intuitive operation for the user.

A second exemplary embodiment of the present invention will be described below. The present exemplary embodiment is different from the first exemplary embodiment in a control method for the stereoscopic display at the time of operating the zoom lever. The operation of the present exemplary embodiment will be described below with reference to the drawings. The imaging apparatus 10 and the stereoscopic display device 350 according to the present exemplary embodiment are similar in configuration to those illustrated in FIGS. 1 and 3, so that description thereof is omitted.

Figure 13:
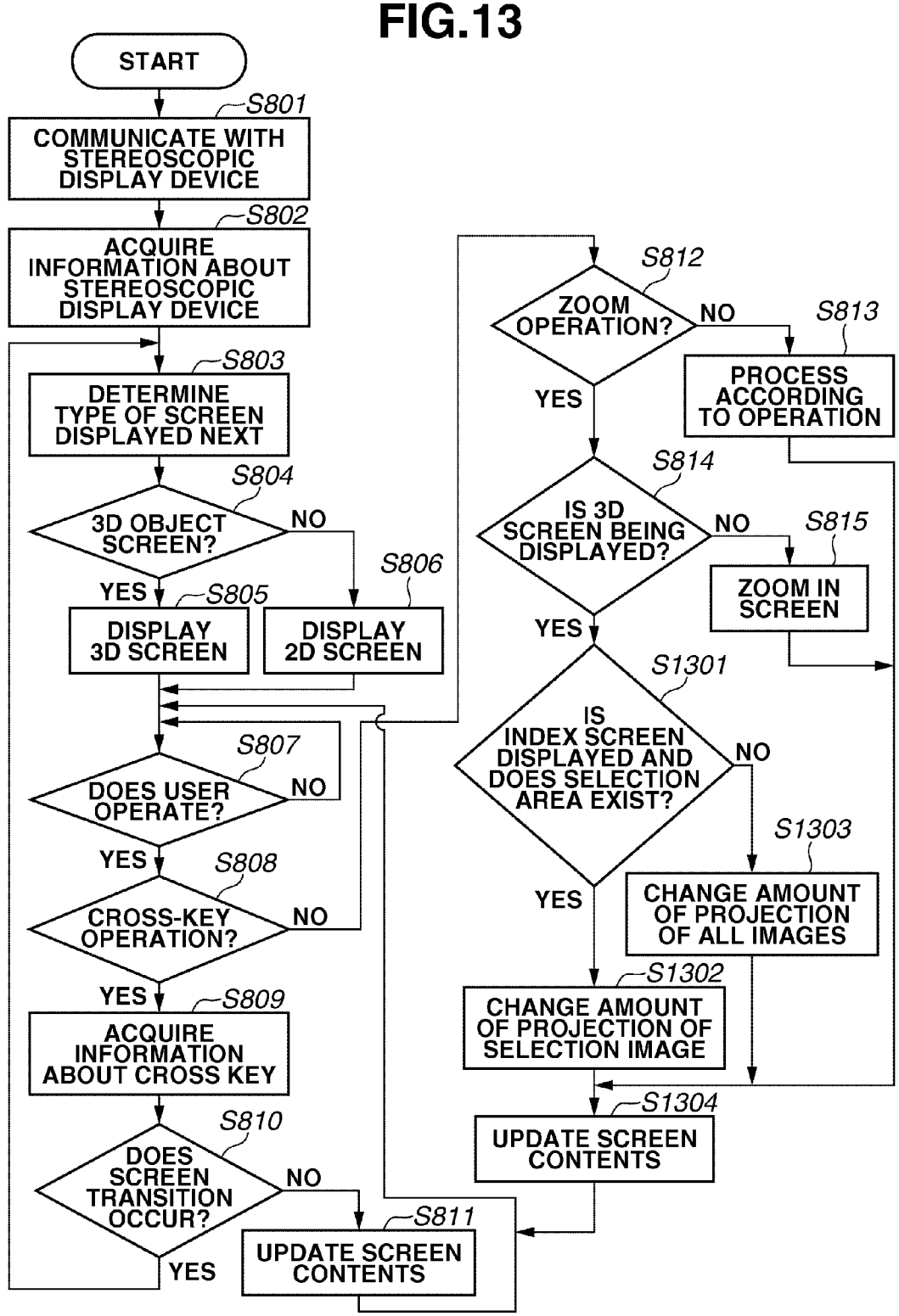
FIG. 13 is a flow chart illustrating an example of a processing procedure for displaying a GUI on the stereoscopic display device from the imaging apparatus according to a second exemplary embodiment.

FIG. 13 is a flow chart illustrating an example of a processing procedure for displaying the GUI on the stereoscopic display device 350 by the imaging apparatus 10 according to the present exemplary embodiment. Each process illustrated in FIG. 13 is controlled by the CPU 109. Similarly, in the description in FIG. 13, it is premised that the imaging apparatus 10 is connected to the stereoscopic display device 350 via the connection cable 315 as illustrated in FIG. 3A. The present exemplary embodiment is different in processing in steps S1301 to S1304 from the first exemplary embodiment. Other processing is similar to those in the first exemplary embodiment, so that description thereof is omitted.

As a result of the determination in step S814, if the 3D screen is being displayed (YES in step S814), in step S1301, the CPU 109 determines whether the screen is the index screen and any image is selected therein.

Figure 14:
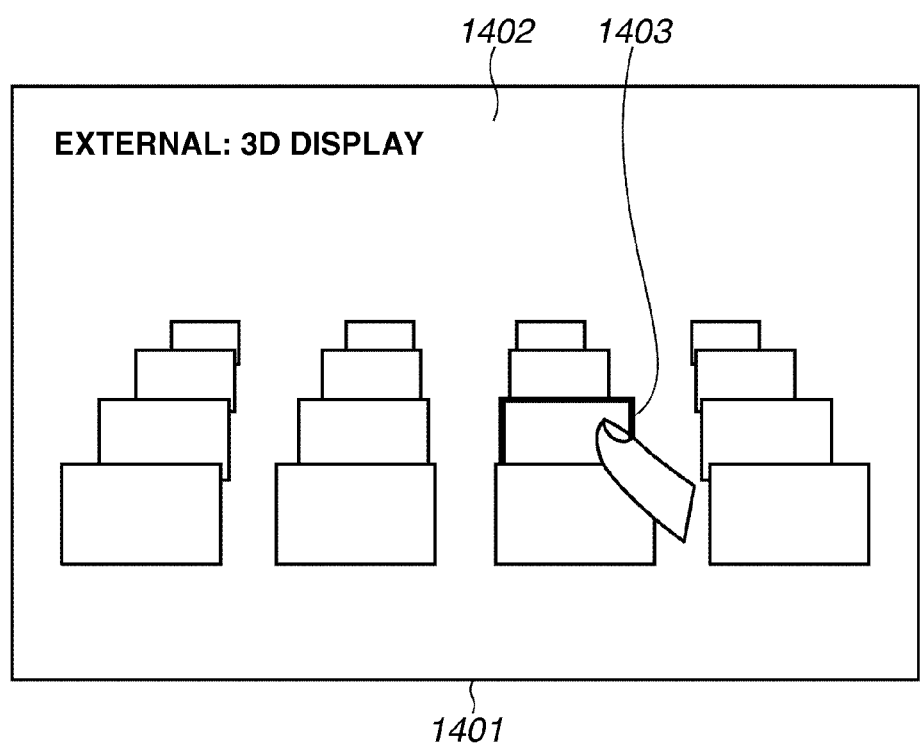
FIG. 14 is an example of an index screen displayed in 3D.

The selection of an image is described with reference to FIG. 14. FIG. 14 illustrates an example of an index screen 1402 displayed on a display panel 1401 of the stereoscopic display device 350. In the present exemplary embodiment, the display panel 1401 is adaptable to a touch panel and a rectangular area represents each representative image.

The representative image can be selected by operating user finger and the information is transmitted to the imaging apparatus 10 via the connection cable 315. In the example illustrated in FIG. 14, the selected representative image is highlighted by a selection frame 1403. The image can also be selected by key operation such as the cross key 310 of the imaging apparatus 10.

As a result of the determination in step S1301, if the screen is the index screen and any image is selected therein (YES in step S1301), the processing proceeds to step S1302 and the amount of protrusion of the selected image is adjusted according to the direction in which the zoom lever 313 is operated. In step S1304, the contents of the screen are updated. As a result of the determination in step S1301, if the screen is not the index screen and any image is not selected therein (NO in step S1301), the processing proceeds to step S1303 and the amount of protrusion of all images (entire screen) is adjusted according to the direction in which the zoom lever 313 is operated. In step S1304, the contents of the screen are updated. A method for generating and displaying the image in which the amount of protrusion is adjusted is similar to that in the first exemplary embodiment.

Figure 15A:
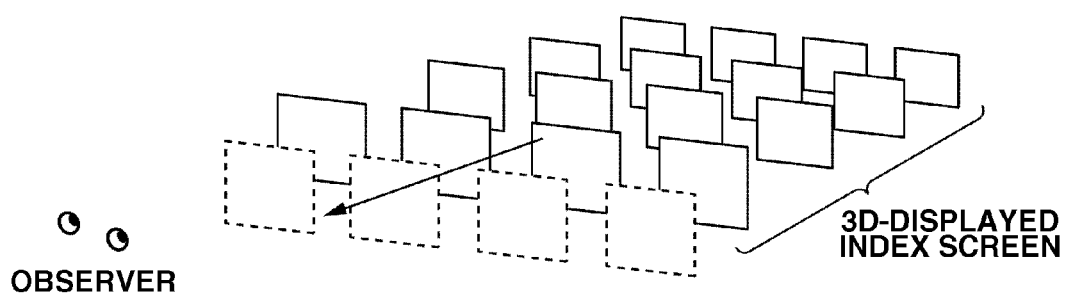
FIGS. 15A and 15B are schematic diagrams illustrating examples when the index screen displayed in 3D changes in its amount of protrusion.

FIG. 15A is a schematic diagram illustrating the index screen in which the amount of protrusion is adjusted by the processing in step S1303. As illustrated in FIG. 15A, when the zoom lever 313 is thrown to the telephoto side, the images are seen as if they moved toward the front side as indicated by an arrow. Thereby, the images originally positioned in the front row are observed as if they popped up to the position indicated by a dotted line. When the zoom lever 313 is thrown to the wide angle side, the images are seen as if they moved to the back side.

Figure 15B:
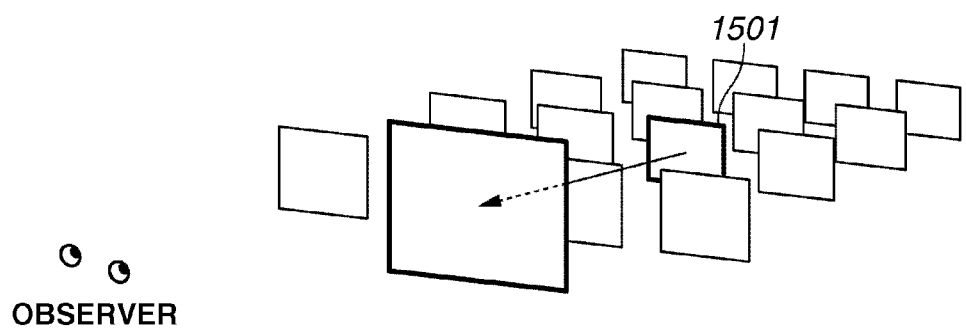

FIG. 15B is a schematic diagram illustrating the index screen in which the amount of protrusion is adjusted by the processing in step S1302. In this case, when the zoom lever 313 is thrown to the telephoto side, only the selected image 1501 is observed as if it popped up toward the front side.

Figure 16:
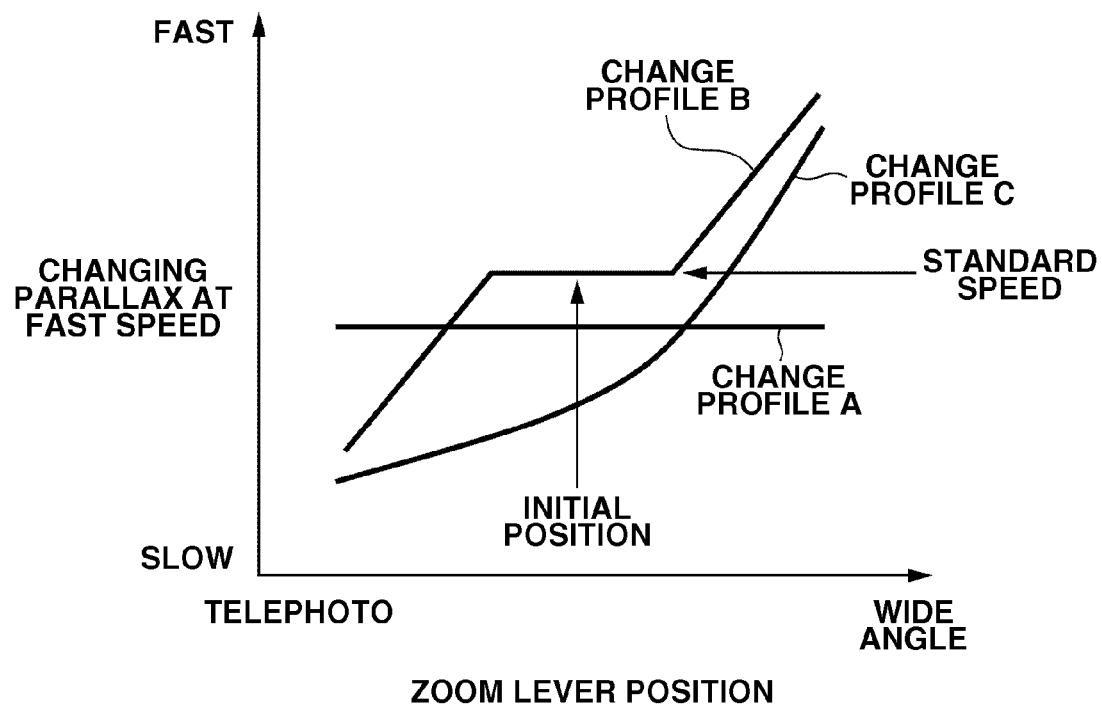
FIG. 16 is a diagram illustrating an example of a change profile.

In the present exemplary embodiment, when the stereoscopic effect is adjusted by the zoom lever 313, the stereoscopic effect (the amount of change in parallax) can be switched according to the position of the zoom lever 313. As illustrated in FIG. 16, for example, a change profile A is the one that changes parallax at always the same speed independently of the position of the zoom lever 313.

On the other hand, a change profile B is the one that changes parallax at a predetermined standard speed in the vicinity of an initial position of the zoom lever 313. If the change profile B exceeds the vicinity of the initial position, the change speed of parallax with respect to the operation of the zoom lever 313 is made faster than the standard speed as the zoom lever 313 moves to the wide angle side and the change speed of parallax is made slower than the standard speed as the zoom lever 313 moves to the telephoto side. In this case, the user observes the 3D display as if the moving speed was increased as the image moves to the back side and as if the moving speed was decreased as the image pops up toward the front side. As indicated by the change profile C, the change speed may be set in a curve.

According to the present exemplary embodiment, the speed at which the stereoscopic effect is changed according to the position of the zoom lever 313 can be changed. Thereby, when the image exists at a near position, a subtle adjustment can be performed at a slow speed. When the image is moved far, the image can be quickly moved to improve operability. Because the stereoscopic effect is adjusted using the zoom lever in which a general user is accustomed to handle, the stereoscopic effect can be simply adjusted with more intuitive operational feeling.

Other exemplary embodiments will be described below. In the first and second exemplary embodiment, the examples are described in which the 3D display is performed on the stereoscopic display device 350, however, the 3D display may be similarly performed on the display panel 107 of the imaging apparatus 10. In this case, the imaging apparatus 10 does not communicate with the external device, so that the imaging apparatus 10 does not need to be connected to the external device via the connection cable, unlike FIG. 3A, the processing in step S801 is not performed. Since the imaging apparatus 10 previously stores own conditional information as illustrated in FIG. 4, the imaging apparatus 10 does not need the processing for acquiring conditional information in step S802. In steps S805 and S806, since the video signal processing unit 106 outputs a 2D or 3D image to the display panel 107, display illustrated in FIG. 9 is not performed.

The CPU 109 may be controlled by a hardware, or a plurality of hardware may share processing to control the entire apparatus. Although the present invention is described in detail above based on its embodiments, the present invention is not limited to these specific exemplary embodiments, and various exemplary embodiments are also included in the present invention without deviating from the gist of the present invention. Furthermore, each of the above described exemplary embodiments is merely an exemplary embodiment of the present invention. The exemplary embodiments may be appropriately combined with each other.

In the above exemplary embodiments, an example is described in which the present invention is applied to the imaging apparatus. The present invention is not limited to the example and can be applied to an apparatus including a zoom operation member for instructing the optical or electronic zooms. Specifically, the present invention can be applied to a cellular phone terminal with a camera, a music player with a camera, a game machine with a camera, and an electronic book reader with a camera.

Other Embodiments

Aspects of the present invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-154031 filed Jul. 12, 2011, which is hereby incorporated by reference herein in its entirety.

What is claimed is:

1. An imaging apparatus comprising a memory and at least one processor which function as:
   an imaging unit;
   a reception unit configured to receive operation from a user;
   an optical zoom unit configured, at a time of imaging by the imaging unit, to perform control such that in response to receiving a first operation by the reception unit, the optical zoom unit drives a zoom lens used for imaging in the imaging unit to a telephoto side to perform optical zoom, and in response to receiving a second operation by the reception unit, the optical zoom unit drives the zoom lens to a wide angle side;
   an output unit capable of outputting an image for three dimensional (3D) display to a display unit; and
   a parallax-amount adjustment unit configured, in response to receiving the first operation or the second operation by the reception unit while the output unit is outputting the image for the 3D display, to adjust an amount of parallax of the image for the 3D display to be output from the output unit;
   a selection unit configured to select a partial area of the image for the 3D display output from the output unit; and
   a control unit configured, in response to receiving the first operation or the second operation by the reception unit when the selection unit selects the partial area of the image for the 3D display, to perform control so that an electronic zoom processing unit electronically zooms in the partial area selected by the selection unit and in response to receiving the first operation or the second operation by the reception unit when the selection unit does not select the partial area of the image for the 3D display, to perform control so that the parallax-amount adjustment unit adjusts the amount of parallax of the image for displaying the 3D to be output from the output unit.

2. The imaging apparatus according to claim 1, wherein the parallax-amount adjustment unit is configured, in response to receiving the first operation by the reception unit, to adjust the amount of parallax to increase an amount of protrusion of the image for the 3D display, and in response to receiving the second operation by the reception unit, to adjust the amount of parallax to decrease the amount of protrusion of the image for the 3D display.

3. The imaging apparatus according to claim 1, wherein the image for displaying the 3D includes an image for a left eye and an image for a right eye, and
   wherein the parallax-amount adjustment unit is configured, in response to receiving the first operation by the reception unit, to shift the image for the left eye to the right and the image for the right eye to the left, and in response to receiving the second operation by the reception unit, to shift the image for the left eye to the left and the image for the right eye to the right.

4. The imaging apparatus according to claim 1, further comprising an electronic zoom processing unit configured, in response to receiving the first operation or the second operation by the reception unit, to electronically zoom an image output from the output unit.

5. The imaging apparatus according to claim 4, wherein the electronic zoom processing unit is configured, in response to receiving the first operation by the reception unit, to perform enlargement processing by the electronic zoom, and in response to receiving the second operation by the reception unit, to perform reduction processing by the electronic zoom.

6. The imaging apparatus according to claim 4, wherein the output unit is configure to be capable of outputting also an image for two dimensional (2D) display, and
   wherein the electronic zoom processing unit is configured, in response to receiving the first operation or the second operation by the reception unit while the output unit is outputting the image for displaying 2D, to electronically zoom the image for 2D display output from the output unit.

7. The imaging apparatus according to claim 1, wherein the reception unit receives operation for a single zoom operation unit capable of the first operation and the second operation.

8. The imaging apparatus according to claim 7, wherein the reception unit is configured to receive operation for the zoom operation unit capable of performing operation to a plurality of positions, and
   wherein the parallax-amount adjustment unit is configured to stepwise change the amount of parallax at a different changing speed in which any of the plurality of positions the zoom operation unit is operated.

9. The imaging apparatus according to claim 1, further comprising a connection unit configured to connect with an external device including the display unit, wherein the output unit outputs the image for the 3D display to the display unit via the connection unit.

10. The imaging apparatus according to claim 1, further comprising the display unit.

11. A method for controlling an imaging apparatus including an imaging unit and an output unit capable of outputting an image for three dimensional (3D) display to a display unit, the method comprising:
   receiving operation from a user;
   performing optical zoom, at a time of imaging in the imaging unit, to drive a zoom lens used for imaging in the imaging unit to a telephoto side to perform optical zoom in response to reception of a first operation, and to drive the zoom lens to a wide angle side to perform optical zoom in response to reception of a second operation; and
   adjusting an amount of parallax of an image for 3D display to be output from the output unit in response to the reception of the first operation or the second operation while the output unit is outputting the image for the 3D display;
   selecting a partial area of the image for the 3D display output from the output unit; and
   performing control, in response to reception of the first operation or the second operation when the selecting selects the partial area of the image for the 3D display, to electronically zoom in the selected partial area, and in response to reception of the first operation or the second operation when the selecting does not select the partial area of the image for the 3D display, to adjust the amount of parallax of the image for displaying the 3D to be output from the output unit.

12. A non-transitory computer-readable storage medium storing a program for causing a computer to execute a control method comprising:
- receiving operation from a user;
- performing optical zoom, at a time of imaging in an imaging unit, to drive a zoom lens used for imaging in the imaging unit to a telephoto side to perform optical zoom in response to reception of a first operation, and to drive the zoom lens to a wide angle side in response to reception of a second operation; and
- adjusting an amount of parallax of an image for three dimensional (3D) display to be output from an output unit in response to the reception of the first operation or the second operation while the output unit is outputting the image for the 3D display;
- selecting a partial area of the image for the 3D display output from the output unit; and
- performing control, in response to reception of the first operation or the second operation when the selecting selects the partial area of the image for the 3D display, to electronically zoom in the selected partial area and, in response to reception of the first operation or the second operation when the selecting does not select the partial area of the image for the 3D display, to adjust the amount of parallax of the image for displaying the 3D to be output from the output unit.

13. An imaging apparatus comprising a memory and at least one processor which function as:
- an imaging unit;
- a reception unit configured to receive operation from a user;
- an optical zoom unit configured, at a time of imaging by the imaging unit, to perform control such that in response to receiving a first operation by the reception unit, the optical zoom unit drives a zoom lens used for imaging in the imaging unit to a telephoto side to perform optical zoom, and in response to receiving a second operation by the reception unit, the optical zoom unit drives the zoom lens to a wide angle side;
- an output unit capable of outputting an image for three dimensional (3D) display to a display unit; and
- a parallax-amount adjustment unit configured, in response to receiving the first operation or the second operation by the reception unit while the output unit is outputting the image for the 3D display, to adjust an amount of parallax of the image for the 3D display to be output from the output unit,
- wherein the reception unit receives operation for a single zoom operation unit capable of the first operation and the second operation,
- wherein the reception unit is configured to receive operation for the zoom operation unit capable of performing operation to a plurality of positions, and
- wherein the parallax-amount adjustment unit is configured to stepwise change the amount of parallax at a different changing speed in which any of the plurality of positions the zoom operation unit is operated.

14. The imaging apparatus according to claim 13, wherein the parallax-amount adjustment unit is configured, in response to receiving the first operation by the reception unit, to adjust the amount of parallax to increase an amount of protrusion of the image for the 3D display, and in response to receiving the second operation by the reception unit, to adjust the amount of parallax to decrease the amount of protrusion of the image for the 3D display.

15. The imaging apparatus according to claim 13, wherein the image for displaying the 3D includes an image for a left eye and an image for a right eye, and
- wherein the parallax-amount adjustment unit is configured, in response to receiving the first operation by the reception unit, to shift the image for the left eye to the right and the image for the right eye to the left, and in response to receiving the second operation by the reception unit, to shift the image for the left eye to the left and the image for the right eye to the right.

16. The imaging apparatus according to claim 13, further comprising an electronic zoom processing unit configured, in response to receiving the first operation or the second operation by the reception unit, to electronically zoom an image output from the output unit.

17. The imaging apparatus according to claim 16, wherein the electronic zoom processing unit is configured, in response to receiving the first operation by the reception unit, to perform enlargement processing by the electronic zoom, and in response to receiving the second operation by the reception unit, to perform reduction processing by the electronic zoom.

18. The imaging apparatus according to claim 16, wherein the output unit is configured to be capable of outputting also an image for two dimensional (2D) display, and
- wherein the electronic zoom processing unit is configured, in response to receiving the first operation or the second operation by the reception unit while the output unit is outputting the image for displaying 2D, to electronically zoom the image for 2D display output from the output unit.

19. The imaging apparatus according to claim 13, further comprising a connection unit configured to connect with an external device including the display unit, wherein the output unit outputs the image for the 3D display to the display unit via the connection unit.

20. The imaging apparatus according to claim 13, further comprising the display unit.

21. A method for controlling an imaging apparatus including an imaging unit and an output unit capable of outputting an image for three dimensional (3D) display to a display unit, the method comprising:
- receiving operation from a user;
- performing optical zoom, at a time of imaging in the imaging unit, to drive a zoom lens used for imaging in the imaging unit to a telephoto side to perform optical zoom in response to reception of a first operation, and to drive the zoom lens to a wide angle side to perform optical zoom in response to reception of a second operation; and
- adjusting an amount of parallax of an image for 3D display to be output from the output unit in response to the reception of the first operation or the second operation while the output unit is outputting the image for the 3D display;
- wherein the receiving operation receives operation for a single zoom operation unit capable of the first operation and the second operation,
- wherein the receiving operation receives operation for the zoom operation unit capable of performing operation to a plurality of positions, and
- wherein the adjusting an amount of parallax stepwise changes the amount of parallax at a different changing speed in which any of the plurality of positions the zoom operation unit is operated.

22. A non-transitory computer-readable storage medium storing a program for causing a computer to execute a control method comprising:
- receiving operation from a user;

performing optical zoom, at a time of imaging in the imaging unit, to drive a zoom lens used for imaging in the imaging unit to a telephoto side to perform optical zoom in response to reception of a first operation, and to drive the zoom lens to a wide angle side to perform optical zoom in response to reception of a second operation; and adjusting an amount of parallax of an image for 3D display to be output from an output unit in response to the reception of the first operation or the second operation while the output unit is outputting the image for the 3D display;

wherein the receiving operation receives operation for a single zoom operation unit capable of the first operation and the second operation, wherein the receiving operation receives operation for the zoom operation unit capable of performing operation to a plurality of positions, and wherein the adjusting an amount of parallax stepwise changes the amount of parallax at a different changing speed in which any of the plurality of positions the zoom operation unit is operated.

* * * * *